Figure 1:
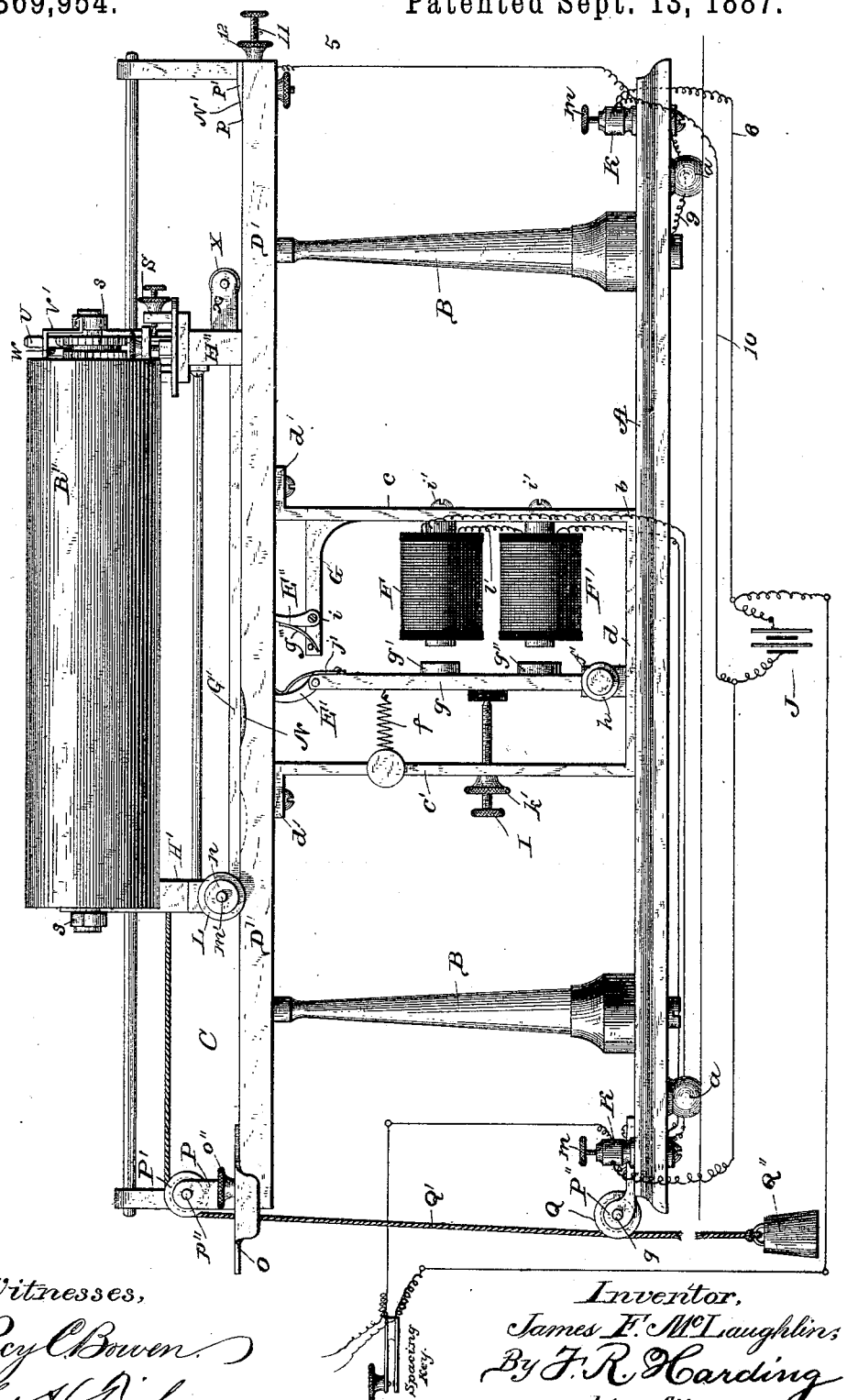

(No Model.) 5 Sheets—Sheet 2.
J. F. McLAUGHLIN.
AUTOMATIC REVERSE MOVEMENT AND SPACING MECHANISM FOR
ELECTRICAL AND MECHANICAL TYPE WRITERS.
No. 369,954. Patented Sept. 13, 1887.
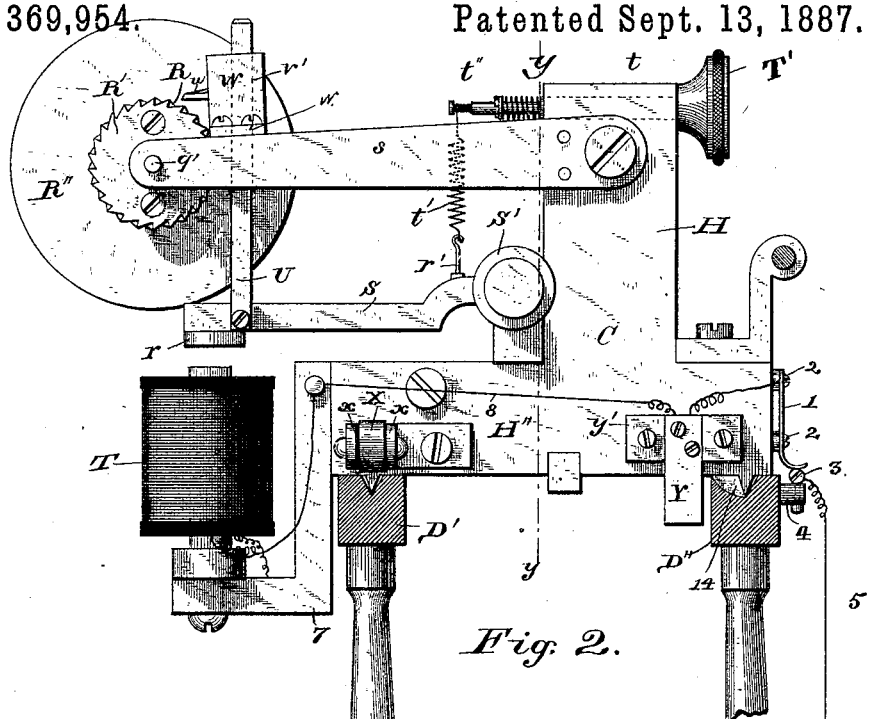
Fig. 2.
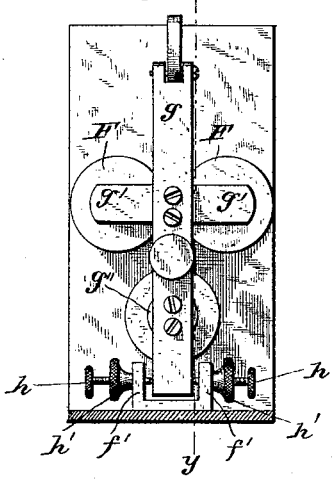
Fig. 7.
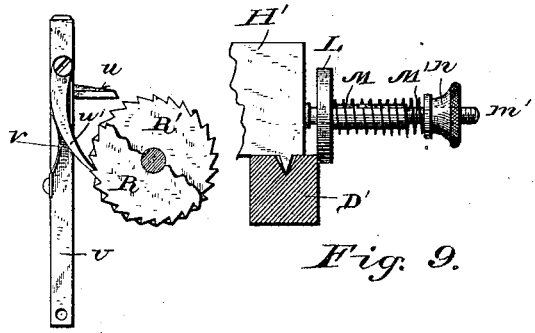
Fig. 6.
Fig. 8.
Fig. 9.
Witnesses:
Roy C. Bowen
Geo. H. Tichenor
Inventor:
James F. McLaughlin,
By F. R. Harding
his Attorney.
N. PETERS, Photo-Lithographer, Washington, D. C.

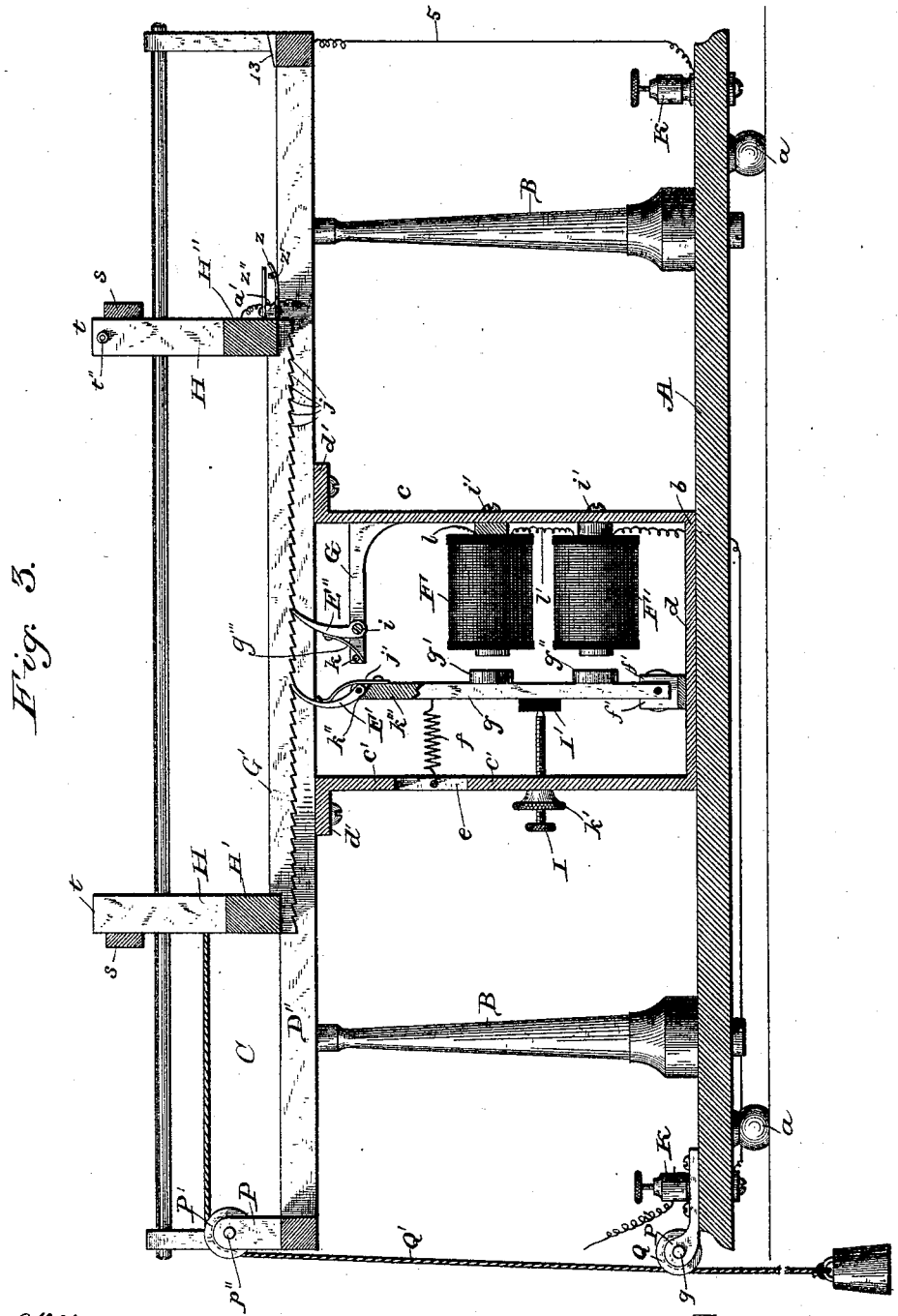

(No Model.) 5 Sheets—Sheet 4.
J. F. McLAUGHLIN.
AUTOMATIC REVERSE MOVEMENT AND SPACING MECHANISM FOR ELECTRICAL AND MECHANICAL TYPE WRITERS.
No. 369,954. Patented Sept. 13, 1887.
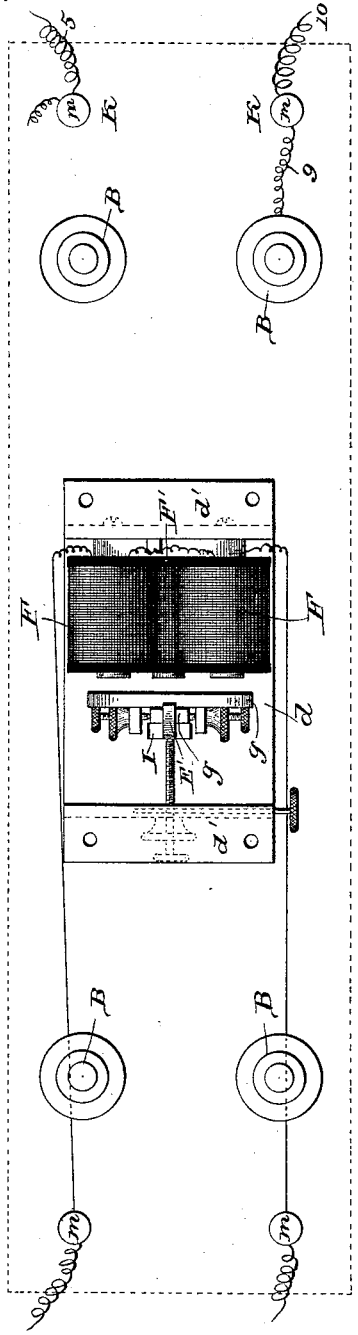
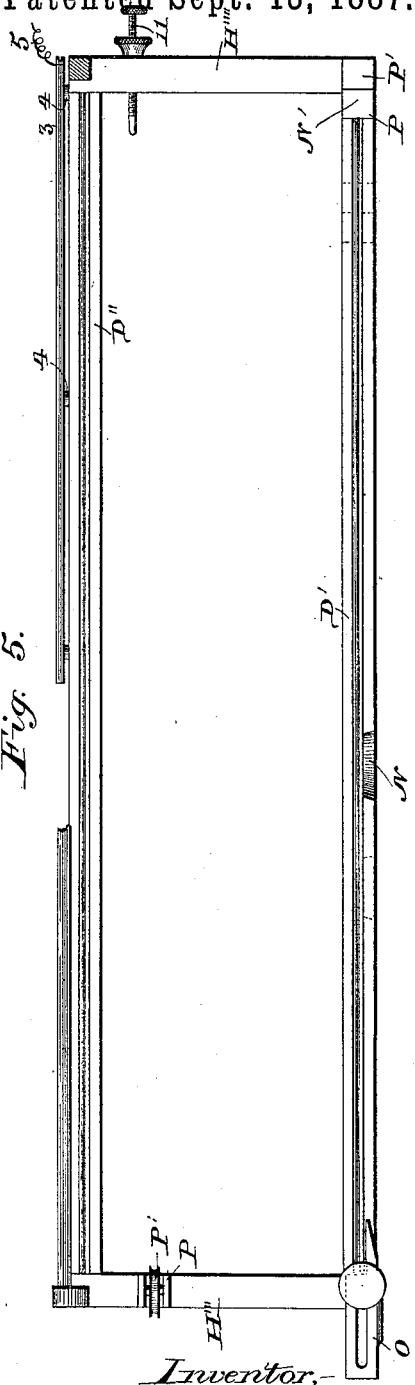
Witnesses,
Percy C. Bowen
Geo. H. Tichenor
Inventor,—
James F. McLaughlin.
By F. R. Harding
his Attorney.

(No Model.)   5 Sheets—Sheet 5.
J. F. McLAUGHLIN.
AUTOMATIC REVERSE MOVEMENT AND SPACING MECHANISM FOR ELECTRICAL AND MECHANICAL TYPE WRITERS.
No. 369,954. Patented Sept. 13, 1887.
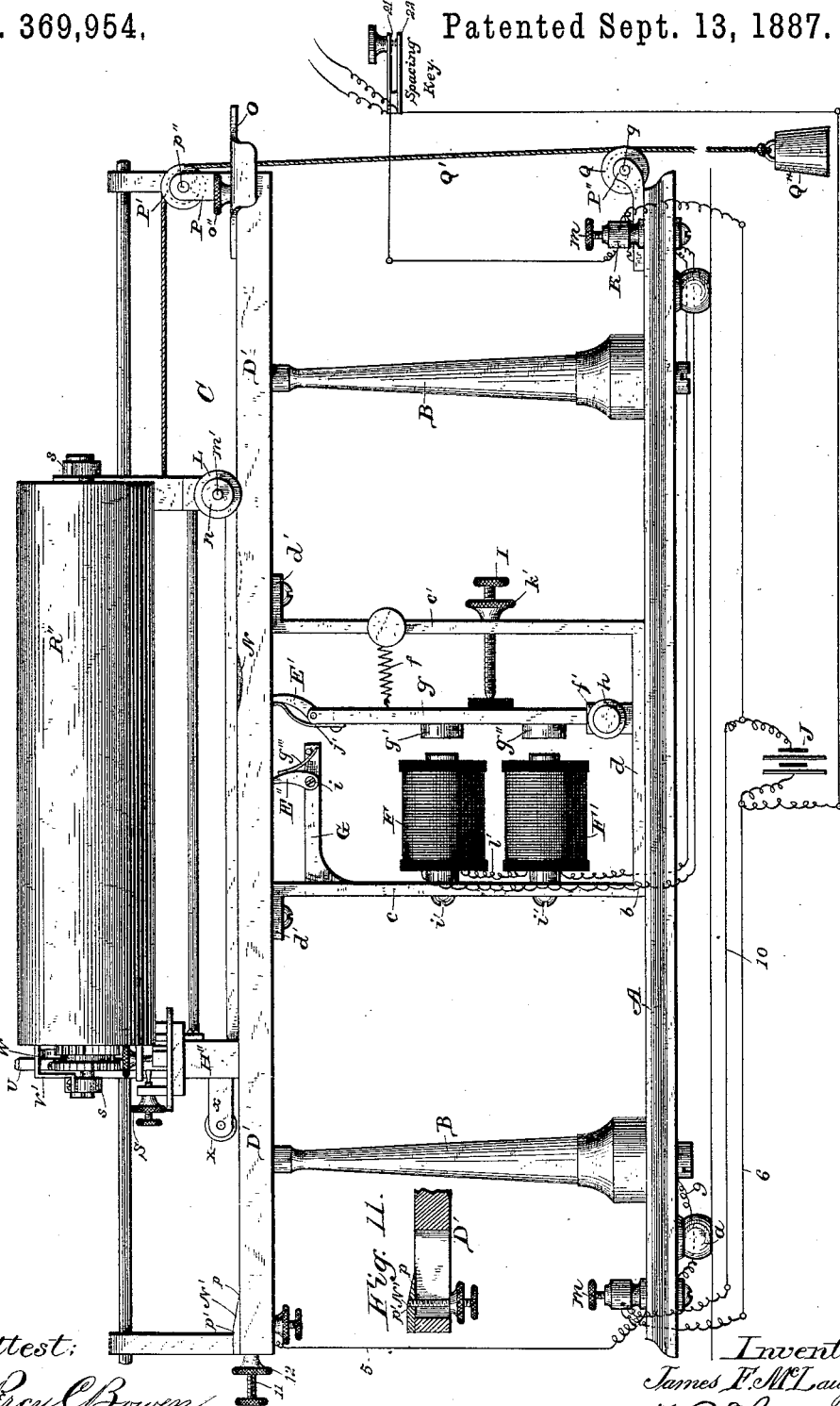
Attest:
Percy C. Bowen
Geo. H. Tichenor
Inventor:
James F. McLaughlin
By F. R. Harding
his Attorney.

UNITED STATES PATENT OFFICE.

JAMES F. McLAUGHLIN, OF PHILADELPHIA, PENNSYLVANIA.

AUTOMATIC REVERSE MOVEMENT AND SPACING MECHANISM FOR ELECTRICAL AND MECHANICAL TYPE-WRITERS.

SPECIFICATION forming part of Letters Patent No. 369,954, dated September 13, 1887.

Application filed December 10, 1886. Serial No. 221,239. (No model.)

*To all whom it may concern:*

Be it known that I, JAMES F. MCLAUGHLIN, a citizen of the United States, residing at Philadelphia, in the county of Philadelphia and State of Pennsylvania, have invented certain new and useful Improvements in Automatic Reverse Movement and Spacing Mechanism for Electrical and Mechanical Type-Writers; and I do hereby declare the following to be a full, clear, and exact description of the invention, such as will enable others skilled in the art to which it appertains to make and use the same.

My invention relates to an electrical type-writer, and has for its object, first, to provide a simple, durable, and operative mechanical device for automatically reversing or returning the traveling carriage to the beginning of the next succeeding line after the desired space is automatically made between the completed line and the next to be printed; second, to furnish an improvement upon the electro-mechanical spacing mechanism shown and described in my separate pending application, Serial No. 217,338, filed October 27, 1886, whereby the line-spacing is effected automatically when the traveling carriage reaches terminus of line.

The auxiliary electro-mechanical devices, whereby the traveling carriage is advanced step by step at a determinate instant after each imprint or registration of a type-lever is made upon the paper roll which is carried by said traveling carriage, is shown and described herein, but will not be claimed, as the same will form the subject-matter of a future application. This means is actuated or set into motion by the closure of the electrical spacing-circuit, which is operated either by a spacing-key (shown hereinafter) or automatically by the movement of any type-lever. However, this latter feature—viz., the automatic operation of the spacing-circuit—is not shown or described herein, as the same forms subject-matter of Patent No. 367,650, granted to me August 2, 1887. Therefore only an ordinary circuit-closer is shown for this purpose. The construction and operation of the said type-levers are shown, described, and claimed in my pending application, Serial No. 219,616, filed November 23, 1886.

With these ends in view my invention consists in certain details of construction, arrangement, and combination of parts, which will be more fully described hereinafter, and the specific points of novelty in which will be designated in the appended claims.

Referring to the accompanying drawings, Figure 1 is a front elevation of my invention complete, showing the traveling carriage adapted to travel from right to left, the magnet shown in Fig. 2 being removed to more clearly show the front guide-rest and the roller attached to the left end of the traveling carriage. Fig. 2 is a transverse section through the longitudinal guide-rests of the traveling carriage, the electro-magnetic letter-spacing motor and the base being detached, showing the electro-mechanical line-spacing mechanism on end of said carriage and paper roll. Fig. 3 is a longitudinal sectional view taken on lines $y\,y$, Figs. 2 and 7. Fig. 4 is a top plan view with traveling carriage and its platform and frame-work removed, showing the electrical connections. Fig. 5 is a top plan view of elevated platform with the traveling carriage detached, showing the contact and guide rods, the construction of the longitudinal guide-rests, the adjustable roller-plate, and the weight-pulley. Fig. 6 is a detail perspective view of the adjustable roller-plate at beginning of line. Fig. 7 is a front elevation of the letter-spacing motor, showing arrangement of electro-magnets and pivoted armatures. Fig. 8 is a detail elevation of the improved pawl-and-ratchet mechanism on end of paper roll, and Fig. 9 is a detail view, with parts broken away and partly in section, of the front cross-bar of traveling carriage, its V shaped projection, the front guide-rest of elevated platform, the V-shaped recess therein, and the adjustable spring-actuated reversing-roller journaled upon a short projecting shaft, which in turn is secured at its inner end to the front cross-bar of traveling carriage. Fig. 10 is a front elevation similar to Fig. 1, showing carriage traveling from left to right. Fig. 11 is a detail view of the adjustable plate at the right end of the guide-rest or cross-bar.

Like letters of reference mark the same parts in all the figures of the drawings.

The construction of the paper roll, the supporting-arms for paper roll, the guide-rod for the carriage, and the frame-work of said traveling carriage being substantially similar to these corresponding parts in my application, Serial No. 217,338, filed October 27, 1886, they will not be further described or claimed herein.

Referring to drawings by letters, A represents a base, of suitable dimensions and material, having the supports a a.

B B are four metallic standards supporting the guide-rests D' and D" of platform C and properly fastened to the base A of instrument.

Centrally upon the base A is secured a rectangular frame or plate, b, which is rigidly screwed or riveted to the under side of the rear guide-rest, D", of the platform C. This frame is made preferably of non-magnetic metal, and consists of the two upright plates c c', the base-plate d, and the two arms d' d', formed, respectively, at right angles to the upright plates c c', the whole being made in one single piece.

e is a rectangular slot in the plates c', in which is secured the clamping thumb-screw $e^2$, to which is attached one end of the adjustable retracting-spring f, the other end of which is fastened to the vertical pivoted plate g, carrying the armatures g' g". The vertical plate is pivoted at its lower extremity between two upright parallel lugs, f" f', by two clamping-screws, h h, provided with the adjustable clamp-nuts h' h', as shown in Fig. 7. These screws h h are designed to fit each in a conical recess on the side of the armature g. The upper extremity of plate g is formed bifurcated, as shown in Fig. 7, and has the curved pawl or dog E' pivotally secured therein, as will be more fully explained hereinafter.

The armature g' is made of soft iron or other suitable metal secured upon the face of the plate g, and of sufficient length to extend across the poles of the two upper magnets, F F. The armature g" is also secured upon the plate g opposite to the pole of the magnet F' and below the armature g'.

G designates an extension arm or bracket centrally secured near the top of the upright plate c, and serves as a support for the spring-actuated dog or pawl E", which is pivotally fastened to the said bracket or arm by a small pivot-screw, i. The rack bar G' is longitudinally arranged on the under side of the traveling carriage H, and is secured at each end in the side bars, H' H", between the guide-rests D' D" of the platform C. The series of teeth j j cut upon the lower edge of said rack are formed obliquely, as shown, with their longer sides inclined toward the left or beginning of the line, the object of this construction being to allow the pawl E' to disengage itself therefrom after it has advanced the traveling carriage forward the distance between any two adjacent teeth of said rack-bar.

j' is a curved tension-spring which bears at its free end upon the pawl E', and is secured at its other end to the plate g, and g''' is another tension-spring secured at one end upon the pawl E", and has its free end limited by the stud k on the end of the arm G. The electro-magnets F F are secured in the same horizontal line upon the same plate secured inside of upright plate c by screws i' i', and the magnet F' is secured below the magnets F F and opposite to its respective armature, g".

I designates an adjustable screw which passes through a perforation in the plate c', and is provided with a clamp-nut, k', and I' is a small disk-shaped rubber cushion placed on the back of the pivoted plate g, opposite the screw I.

k" is a curved shoulder formed on the inner side of the lug or prong k''', and serves to limit the backward movement of the pawl E', thereby preventing the said pawl from being retracted too far through agency of spring j' after it is released from one of the teeth j.

The electro-magnets F F are electrically connected with each other by wire l and with the magnet F' by wire l'. The battery J is in circuit with the electro-magnets F F, and F', and the spacing-key by suitable electrical wire connections, as shown in Figs. 1 and 4.

K K are four binding-posts (two only being shown) arranged at each angle or corner of the base A, and provided with clamping-screws m m, as shown.

Referring to Figs. 1 and 9, L is a small roller, made of hard steel, loosely journaled upon the shaft m', which is screw-threaded on its outer end and rigidly secured to the front end of the side bar, H'. M is a small thimble or collar placed on the said shaft between the roll and the adjustable clamping-nut n.

N designates an arc-shaped recess located in the cross-bar or guide rest D' of the platform C, between the longitudinal V-shaped recess and the outer edge of the said guide-rest. This arc-shaped recess is of greatest depth at the edge of the cross bar D', and merges gradually into the plane of the top of said cross-bar between the V-shaped recess and the outer edge thereof. The radius of the greatest depth of the said recess is equal to the radius of the arc of the roller which is below the plane of guide-rest, as shown clearly in Figs. 1 and 9. The distance from the recess N to the adjustable roller-plate N' corresponds to the length of the traveling carriage H.

O represents an adjustable plate, which is placed on the left-hand end of the guide-rest D', and consists of the flat rectangular portion o, provided with slot o' for the clamping-screw o", the projecting end o''' having an inner straight side at right angles to the end of portion o, and its outer inclined side at an obtuse angle thereto, and the downwardly-projecting flange o'''', which is designed to engage the side of the guide-rest D'.

The slot o' coincides with the V-shaped recess, and the clamping-screw o" engages and holds in said recess. The plate N' at right-hand end of cross-bar D' is also formed adjustable by means of a clamping-screw and slot in end of the cross-bar, (see Fig. 11,) and consists of a rectangular or wedge-shaped plate having its under side straight, as shown, and fitted upon cross-bar D', and its upper side inclined or beveled from the point $p$ to point $p'$.

Midway on the side bar, H', are screwed two upright parallel bearing-lugs, P P, (one only being shown), between which are journaled on a shaft, $p''$, the pulley-wheel P', and on the corresponding end of the base A are fastened two horizontally-projecting parallel lugs, P'' P'', carrying the shaft $q$, upon which is journaled the guiding-pulley Q.

Q' is a suitable cord or table attached centrally at one end to the side bar, H', of the traveling carriage H, and having the depending weight Q'' secured at its other end, as shown clearly in Fig. 1. A cord, Q', passes over both pulley-wheels P' and Q', the pulley Q preventing it from impinging against the base A of the instrument.

As shown in Fig. 2, there are two ratchet-wheels, R R', of the same diameter, but having their respective teeth inclined in opposite directions, journaled rigidly upon a short shaft, $q'$, which is secured at inner end in the end R'' of the paper roll.

S is an arm pivotally secured by means of thumb-screw S' to the frame-work of the traveling carriage at its inner end, and carrying on its outer end the armature $r$, which is secured on the under side of said arm in proximity to the electro-magnet T. This arm S is parallel with the arm $s$, which supports the paper roll, and is provided with the upwardly-extending link-rod $r'$.

T' is an adjustable spring-actuated thumb-screw, which passes through the pillar $t$ of the frame-work and has one end of the retracting-spring $t'$ coiled around the end $t''$ thereof, the other end of said retracting-spring being secured to the link-rod $r'$ of the arm S.

U designates a vertical standard which is fastened at one end to the forward end of arm S by a small screw, as shown, and is provided at its upper end with two pawls, $u$ $u'$, the pawl $u'$ being pivoted on one side of the said standard, so as to engage the teeth of ratchet-wheel R, while the pawl $u$ is rigidly fastened on the other side of said standard, so as to engage teeth of ratchet-wheel R' when the standard is pulled downward by the attraction of armature $r$ to its magnet T.

$v$ is a small tension-spring riveted at one end to the standard U, and bears up against pawl $u'$ to keep it normally within the ratchet-wheel R. Upon the upper edge of arm $s$ is attached a rectangular elbow-shaped guiding-plate, W, which consists of the vertical plate $v'$ and the horizontal plate $w$, having a rectangular slot or perforation, through which the standard U is vertically guided.

X is a small roller mounted loosely on a shaft which is journaled between two lugs, $x$ $x$, secured upon the side bar or cross-head, H'', of the frame-work of traveling carriage. This roller does not engage the guide-rest D' as the carriage advances, but is far enough above the plane thereof to run upon the plate N' when the said carriage reaches end of line.

Y and Y' are two circuit-closing springs secured in proximity to each other on the side bar, H', between the rack-bar and the rear guide-rest and are held a short distance apart by an intervening plug of hard rubber or other insulating material. This construction of spring is the same as shown in my pending application, Serial No. 217,338, filed October 27, 1886; but I prefer to use the arrangement shown in Fig. 3, which consists of a curved lower spring, $z$, provided with a small contact-point, $z'$, on the end, as shown, and the upper straight plate, $z''$, the plates $z$ and $z''$ being separated by a small plug, $a'$, of insulating material. In either construction the springs Y or $z$ must be electrically connected with electro-magnet T, and the springs Y' or $z''$ with the traveling contact-plate 1. This traveling contact-plate is securely attached to the rear end of the side bar, H'', by screws 2 2, and is provided with a curved spring-point, which is constantly in contact with the longitudinal conducting-rod 3, secured upon the projecting studs 4 4, which are fastened to the rear guide-rest, D''. The contact-rod 3 is electrically connected to battery J by wires 5 and 6 and binding-post K.

The magnet T is attached by its lower pole to the bracket-plate 7, which is secured to the front end of the side bar, H'', and is electrically connected with springs, Y' or $z''$, by wires 8, and with the battery J through the standard B, the guide-rest D', the side bar, H'', bracket-plate 7, the wire 9, binding-post K, and wire 10.

11 is a circuit-closing screw, which is secured in a perforation in end of end sill, H'''', of platform C, and in line with the location of spring Y' on traveling carriage. It is provided with a clamp-nut, 12, for adjusting the screw to any desired length. This screw is only used when the construction of spring shown in Fig. 2 is utilized to close an electrical circuit by its contact against said screw when the traveling carriage reaches terminus of line.

When it is desirable to attach spring circuit-closing devices, (shown in Fig. 3,) an adjustable plate, 13, similar in construction to plate N', is attached to the end sill, H'''', opposite to the spring $z$, so that when traveling carriage reaches end of line the curved end of spring $z$ will ride up on the plate 13, and thereby cause the contact of point $z'$ with plate $z''$. In order to allow this traveling carriage to be uplifted when desirable for operator to scan the partly-written line, I provide the rear guide-rest, D'', with a longitudinal curved recess, 14, which will permit the V-shaped projection to have a radial motion therein.

The operation of my invention is as follows: The circuit being closed from battery J by the depression of the spacing-key, (shown in Fig. 1,) the magnets F F and F' are simultaneously energized by the current, and cause the attraction of their respective armatures $g'$ and $g''$, which are, as before stated, secured opposite to their corresponding magnets upon the pivoted vertical plate $g$. This attraction causes the pivoted spring-actuated pawl E' to carry forward the rack-bar of traveling carriage the distance intervening between any two adjacent teeth $j\,j$. The pawl E' will then be retracted by agency of spring $j'$ and limited by the shoulder $k''$, and the spring-actuated pawl E'' will engage and hold in one of said teeth, thereby holding the rack-bar and carriage, while the pawl E' falls back to its normal position upon the breaking of the circuit, either by releasing any particular type-key or the spacing-key, so as to separate the contact-points. When the circuit is thus broken and the current interrupted, the attraction of the armatures $g'\;g''$ by their respective magnets ceases, and the pivoted vertical plate $g$ is withdrawn by the retracting-spring $f$, the cushion I properly limiting the backward movement of said plate. Thus the letter-spacing is continued by each descent of a type-lever or depression of spacing-key until the traveling carriage has advanced to end of line. When the traveling carriage has reached the end of line, the spring $z$ will ride up on the beveled plate 13 and close the circuit from battery J through electrical connections previously described, which will cause the circuit to pass into the magnet T and cause the attraction of armature $r$, and consequently the depression of standard U, carrying pawls $u\,u'$. This action will force the spring-actuated pawl $u'$ to rotate the ratchet-wheel R the distance or line-space between any two adjacent teeth thereof, and at the same time the pawl $u$ will engage one of the teeth of ratchet-wheel R' and prevent the pawl $u'$ from rotating the paper roll more than one line-space. After the line-space is effected in the manner just described the roller X will ride up on the beveled surface of plate N', thereby placing the traveling carriage upon an inclined plane, and at the same time the roller X advances up on plate N' the roller L will be coincident with the arc-shaped recess N of the guide-rest D', and the spring M' will force said roller in the recess N. Now, the carriage being upon an inclined plane and the roller L within the recess N, the weight Q'', attached to end of cord Q', will overcome the weight of traveling carriage and return it to the beginning of the next line to be printed, the roller L running on top of guide-rest D' while carriage is being reversed, lifting the rack-bar above the pawls and out of contact therewith, so as not to interfere with the recoil of the carriage. When the roller reaches the point or projection $o'''$ of the plate O, it will be guided along the inclined edge or side of said projection, and will thereby be automatically returned to the position shown in Fig. 1, ready for the next line to be printed.

It will be obvious that the weight Q'' is of just sufficient size to overcome the weight of traveling carriage and give it sufficient momentum to return without jar or injury.

Instead of the weight Q'', a spring might be substituted without departing from the spirit of my invention. It will also be understood that battery J can be used both for the line and letter spacing mechanism, since they are not both in operation at the same time, and that the electrical connections, binding-posts, and circuit-closing devices may be changed at will.

The different component parts of my invention are simple and durable and capable of being easily interchanged and adjusted.

The automatic line-spacing mechanism or the automatic mechanical reverse movement, or both, may be used as attachments for ordinary type-writers, thereby dispensing with unnecessary and laborious manipulation on the part of the operator.

Having thus described my invention, what I claim as new, and desire to secure by Letters Patent, is—

1. The combination, with the traveling carriage, of the spring-actuated guiding-roller L, the guide-rest provided with the arc-shaped recess N, the inclined plate N' on the end of the said guide-rest, the roller X, and the weight and cord attached to the traveling carriage, whereby the carriage is reversed when it reaches the terminus of its forward course.

2. The combination, with the traveling carriage provided with the rack-bar, of the electro-magnetic step-by-step motor provided with the pawls E' and E'', for advancing the rack-bar, the front guide-rest provided with the arc-shaped recess, the plate N', and the rollers L and X, whereby the rack-bar is thrown out of engagement with the actuating-pawls when the traveling carriage reaches the end of its forward course.

3. The combination of the traveling carriage and its advancing mechanism, the carriage being provided with the adjustable spring-actuated guiding-roller L, with the front guide-rest having the arc-shaped recess therein, located a distance from the end of said guide-rest equal to the length of the traveling carriage, as set forth.

4. The combination, with the traveling carriage, of the spring-actuated guiding-roller L, the plate O, and the front guide-rest, whereby the carriage is restored to its normal position on its return or recoil.

5. The combination of the adjustable plates N' and O, the guide-rest D', having arc-shaped recess N, the spring-actuated roller L, and the traveling carriage provided with roller X, as described.

6. The combination of the adjustable plates N' and O, the front guide-rest provided with arc-shaped recess N, the spring-actuated roller L, journaled on sill H', the roller X, the traveling carriage, and the cord and weight for reversing said carriage when it reaches terminus of line, substantially as described.

7. The combination of the traveling carriage and guide-roller X with the front guide-rest having arc-shaped recess N, the adjustable plates N' and O, the roller L, journaled on shaft $m'$, the spring M', and the collar M, as described.

8. An electro-magnetic step-by-step motor for advancing the traveling carriage, in combination with the rack-bar of said carriage, the front guide-rest provided with arc-shaped recess N, the adjustable plate N', the spring-actuated guiding-roller L, the roller X, and the cord-weight, substantially as specified.

9. The combination of the weight and cord and the guiding-pulleys therefor with the traveling carriage and means for elevating the said carriage upon an inclined plane when it reaches end of line, and the spring-actuated reversing-roller journaled upon an end sill of said carriage and adapted to impinge against the front guide-rest while advancing, and designed to slip through the recess N and upon the top of said guide-rest on return, substantially as specified.

10. The combination of the carriage and guide-rest and the spring-actuated reversing-roller with the adjustable plate secured upon front guide-rest at beginning of line, whereby the said roller on its return is automatically thrown down, so as to impinge against the side of the guide-rest ready for the advance of next line.

11. The combination of the roller L and guide-rest D', having the arc-shaped recess N, the adjustable plate N', and the roller X, as set forth.

12. The combination of the weight and cord with the traveling carriage, the spring-actuated reversing-roller, the adjustable plate N', the front guide-rest having the arc-shaped recess N, and the roller X, properly located therein, as described.

13. The combination of the traveling carriage, the front guide-rest provided with the arc-shaped recess, and the adjustable spring-actuated roller L, adapted to impinge against the side of said guide-rest while the carriage is advancing, and designed to be pushed through recess N, by agency of spring M' on top of the guide-rest D' when carriage reaches end of line, the adjustable spring M', and the projecting shaft $m'$.

14. The combination of traveling carriage, the traveling magnet mounted on frame-work of carriage, the spring circuit-closer, the contact-plate 1, the rod 3, and the circuit, as described.

15. The combination, with the traveling carriage, of the pawl-and-ratchet mechanism on end of paper roll, the plate W, standard U, armature $t$, the adjustable screw T', retracting spring $t'$, the arm S, the traveling magnet T, bracket Z, spring circuit-closer $z$, the traveling contact-plate 1, the longitudinal rod 3, the beveled plate 13, and the circuit and battery, as set forth.

16. The combination, with the traveling carriage, its ratchet-bar, armature-lever, pawl, and actuating electro-magnets, of the roller and incline, whereby the forward end of the carriage is elevated when it has reached its forward limit, so as to place it in position to return automatically to a normal position, substantially as specified.

17. The combination, with the traveling carriage, and the electro-magnet secured thereto and in circuit with a spacing-key, of an armature-lever and pawls, and the ratchet-disks located on the shaft of the paper-spacing roll, whereby the same may be actuated to move the paper, so as to space the lines thereon, substantially as specified.

In testimony whereof I affix my signature in presence of two witnesses.

JAMES F. McLAUGHLIN.

Witnesses:
M. DORIAN,
GEO. H. TICHENOR.